(12) United States Patent
Hayden

(10) Patent No.: US 10,539,096 B2
(45) Date of Patent: Jan. 21, 2020

(54) SYSTEM FOR CONVERTING SLOW BURNING FUELS THAT CONTAIN ASH INTO ENERGY

(76) Inventor: Steven Mark Hayden, Wetumpka, AL (US)

( * ) Notice: Subject to any disclaimer, the term of this patent is extended or adjusted under 35 U.S.C. 154(b) by 1173 days.

(21) Appl. No.: 13/355,353

(22) Filed: Jan. 20, 2012

(65) Prior Publication Data

US 2012/0186220 A1 Jul. 26, 2012

Related U.S. Application Data

(60) Provisional application No. 61/435,087, filed on Jan. 21, 2011.

(51) Int. Cl.
*F02M 21/12* (2006.01)
*F02M 25/038* (2006.01)
*F02M 25/022* (2006.01)

(52) U.S. Cl.
CPC .......... *F02M 21/12* (2013.01); *F02M 25/038* (2013.01); *F02M 25/0228* (2013.01); *Y02T 10/121* (2013.01); *Y02T 10/34* (2013.01)

(58) Field of Classification Search
CPC ...... F02M 21/12; F02M 25/022; Y02T 10/34; Y02T 10/121
USPC ......... 60/39.6, 39.62, 39.63, 39.64; 123/1 A, 123/23; 110/293
See application file for complete search history.

(56) References Cited

U.S. PATENT DOCUMENTS

| | | | | |
|---|---|---|---|---|
| 857,410 A | * | 6/1907 | Morey, Jr. | F02B 75/32 123/197.1 |
| 2,095,315 A | * | 10/1937 | Crocker | F23K 3/14 110/165 R |
| 2,527,594 A | * | 10/1950 | Suman | F23K 3/14 110/165 R |
| 2,551,547 A | * | 5/1951 | Pfau | F23J 1/00 110/277 |
| 2,977,759 A | * | 4/1961 | Milliken | F02G 3/02 60/39.63 |
| 3,171,253 A | * | 3/1965 | Milliken | F02B 25/04 60/39.63 |
| 3,541,787 A | * | 11/1970 | Mario | F01C 1/063 60/39.34 |
| 3,588,677 A | * | 6/1971 | Lvovich | B04B 5/04 324/321 |

(Continued)

FOREIGN PATENT DOCUMENTS

| | | | | |
|---|---|---|---|---|
| DE | 810446 C | * | 8/1951 | F02M 21/12 |
| DE | 20116362 U1 | * | 12/2001 | F23B 1/38 |

*Primary Examiner* — Thai Ba Trieu

(57) ABSTRACT

The present invention is a system to utilize slow burning fuels that contain ash with a piston that is utilized as a compressor and an expander, a pair of combustion chambers, an ash bin with a pathway on each side of the ash bin and a cylinder that houses the piston that is integral to the y-shaped pathway and produces gases that are produced by the piston emitted from the cylinder as well as a connecting rod and a crank shaft. The combustion chambers can be cone-shaped and have one or more fan blades that are made of a nonconductive material and have a positive charge. The present invention also creates a rotating body in a single combustion chamber that provides heat energy for evaporation of water and initiation of ignition of fuels that contain more than 5% water that can be connected to an ash bin to expel ash.

10 Claims, 6 Drawing Sheets

(56) References Cited

U.S. PATENT DOCUMENTS

| | | | | |
|---|---|---|---|---|
| 3,799,127 | A * | 3/1974 | Tseng | F01C 1/3568 |
| | | | | 123/228 |
| 3,808,828 | A * | 5/1974 | Kantor | F01K 11/04 |
| | | | | 417/207 |
| 4,297,111 | A * | 10/1981 | Ross | B01D 3/30 |
| | | | | 159/49 |
| 4,371,382 | A * | 2/1983 | Ross | B01D 3/30 |
| | | | | 159/49 |
| 4,653,436 | A * | 3/1987 | Firey | 123/23 |
| 5,109,808 | A * | 5/1992 | Firey | 123/23 |
| 5,216,982 | A * | 6/1993 | Firey | 123/23 |
| 5,417,183 | A * | 5/1995 | Firey | 123/3 |
| 5,479,893 | A * | 1/1996 | Firey | 123/23 |
| 6,606,982 | B1 * | 8/2003 | Stockhausen et al. | 123/572 |
| 2006/0090469 | A1 * | 5/2006 | Counterman | F28D 19/047 |
| | | | | 60/660 |
| 2008/0053195 | A1 * | 3/2008 | Matter et al. | 73/28.01 |
| 2009/0126607 | A1 * | 5/2009 | Kim | F23B 40/04 |
| | | | | 110/293 |
| 2010/0147233 | A1 * | 6/2010 | Firey | F02B 45/08 |
| | | | | 123/23 |

* cited by examiner

SYSTEM FOR CONVERTING SLOW BURNING FUELS THAT CONTAIN ASH INTO ENERGY

This application claims priority to U.S. Provisional Application 61/435,087 filed on Jan. 21, 2011, the entire disclosure of which is incorporated by reference.

TECHNICAL FIELD & BACKGROUND

Burning solids fuel suspended as an emulsion makes practical sense. Solid fuel like coal is much cheaper per BTU [British thermal unit] than liquid fuel like oil. A barrel of oil has approximately 6.6 gigajoules of heat and costs approximately 110 dollars meaning oil costs approximately 16 dollars per gigajoules of heat. Methanol costs approximately 17 dollars per gigajoule and ethanol approximately 17-20 dollars per gigajoule and coal costs approximately 1 dollar to 4 dollars per gigajoule. Almost all internal combustion engines use liquid fuel. However a solid fuel can be suspended in a liquid to form an emulsion.

Coal particles can be suspended in water, methanol or ethanol. Water is cheaper than methanol or ethanol but it cools any flames and delays or extinguishes any combustion. Ethanol and methanol are adequate to use as fluid for suspension however they cost more than water. Most emulsions will be approximately 40-60 percent solids. Solids can include coal, wood, sugar cane, cellulose, hemicellulose, lignin and other suitable solids.

It is important to maintain temperatures to be hot enough in a combustion chamber to initiate combustion. For this reason maintaining heat in a combustion chamber is very important. Many scientists believe that relatively rapidly with little development effort it will be possible to create emulsions with particle size less than approximately 10 microns and suspend them in a water, methanol and ethanol mixture. The more water in the liquid portion in the mixture, the less it is necessary to use expensive ethanol or methanol. It will be important to have a rotating body that absorbs the heat of combustion during one combustion cycle and releases heat during the next combustion cycle. The design of two combustion chambers burning fuel with approximately 1% ash with complex valves is too complex a valve design to be economically viable, however, emulsion technology will advance relatively quickly. In a relatively short period of time it will be possible to burn a methanol, water and coal mixture with only one combustion chamber per compressed volume to create usable energy.

The ash will need to be ejected periodically at the end of the expansion gas phase or the beginning of the compression phase. The combustion chamber should have a spinning body in it with a large surface area. The spinning body helps rotate and mix the air and the surface area allows the air and fuel to heat up rapidly. One way that it can be done is with plurality of spinning blades that protrude from a central shaft. The spinning blades have a relatively large amount of surface area. The spinning blades may be turned to move the air forwards or backwards along the axis of rotation, or the thin plane of blades may be parallel with a long axis shaft. When gas explosions occur, gas can move from axial direction toward the discharge opening without creating a thrust force or counterforce along the axial line. This reduces thrust loads on the bearings.

Many fuels such as coal, wood and biofuel contain ash. These ash particles will act like an abrasive and create wear on the lubricated surface of an expander. Most engines will use a piston in a cylinder to expand the hot gas and produce energy. The piston must be kept sealed against the cylinder and requires a thin film of lubricant between the piston ring and cylinder. Alternatively, wankel engines use a wankel rotor with a rotor seal that slides against a rotary housing. When fuels with ash are directly burned in an expander, the ash can cause abrasion of the lubricated surface. Fuels with ash are not practical to burn in most engines since the ash will create wear of the lubricated surfaces of the expander. Prior designs have tried to overcome the relatively large amount of wear created by these abrasive particles.

It is an object of the present invention to provide to send compressed gas to an external combustion chamber where the hot combustion gas has ash removed before the gas returns to an expander to create energy. The ash is removed separately through an ash valve to an ash container.

It is an object of the present invention to prevent most of any ash present to avoid enter the expander and create wear on a lubricated surface. Fuel with water in it must vaporize the water before the water fuel mixture combusts. For example coal and water mixtures usually have higher ignition energy than gasoline. Hemicellulose lignin and cellulose mixed with water will need more ignition energy than gasoline. These fuels must burn fast enough to fully oxidize in short phase of maximum compression that typically occurs at top dead center of piston cycle especially at part loads.

It is the object of the present engine to design a combustion chamber that can absorb combustion energy from one combustion cycle and release it into the emulsion fuel mixture of the next combustion cycle. During combustion heat is absorbed onto the surface of rotating body. In the next combustion cycle the heat is released from the rotating surface into the emulsion fuel to initiate vaporization and combustion. The author of this invention is not aware of another internal combustion engine that uses a rotating body inside a combustor to store and then release heat into an emulsion fuel.

It is an object of the present invention to provide an engine that allows a phase of maximum compression to last over a complete 360 degrees of a crankshaft angle, keeping in mind that typical piston and wankel engines do not isolate the compressed gas from the compressor.

It is an object of the present invention to provide an engine that uses a valve between a combustion chamber and a compressor to seal gas in the combustion chamber. While the gas is in the combustion chamber for a relatively prolonged period of time combustion can be fully completed when the valve to expander opens and all heat has been added to the compressed air. This is in contrast to ordinary engine combustion that continues to proceed during a process of gas expansion.

It is anticipated that the effectiveness of the hot rotating body at facilitating combustion of emulsion fuels will lead to proliferation of emulsion fuel research.

As emulsion fuel research occurs lower ash emulsions will be developed that have less than 0.1 percent ash called ultralow ash. The ultralow ash fuel will can be burned in a single combustion chamber connected with a rotating body in the combustion chamber. The ultralow ash fuels that are emulsions can still contain water and would benefit from the hot rotating body in the combustion chamber. A object of this invention is to patent a hot rotating body in combustion chamber of engine that burns liquid solid emulsion that contain water.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
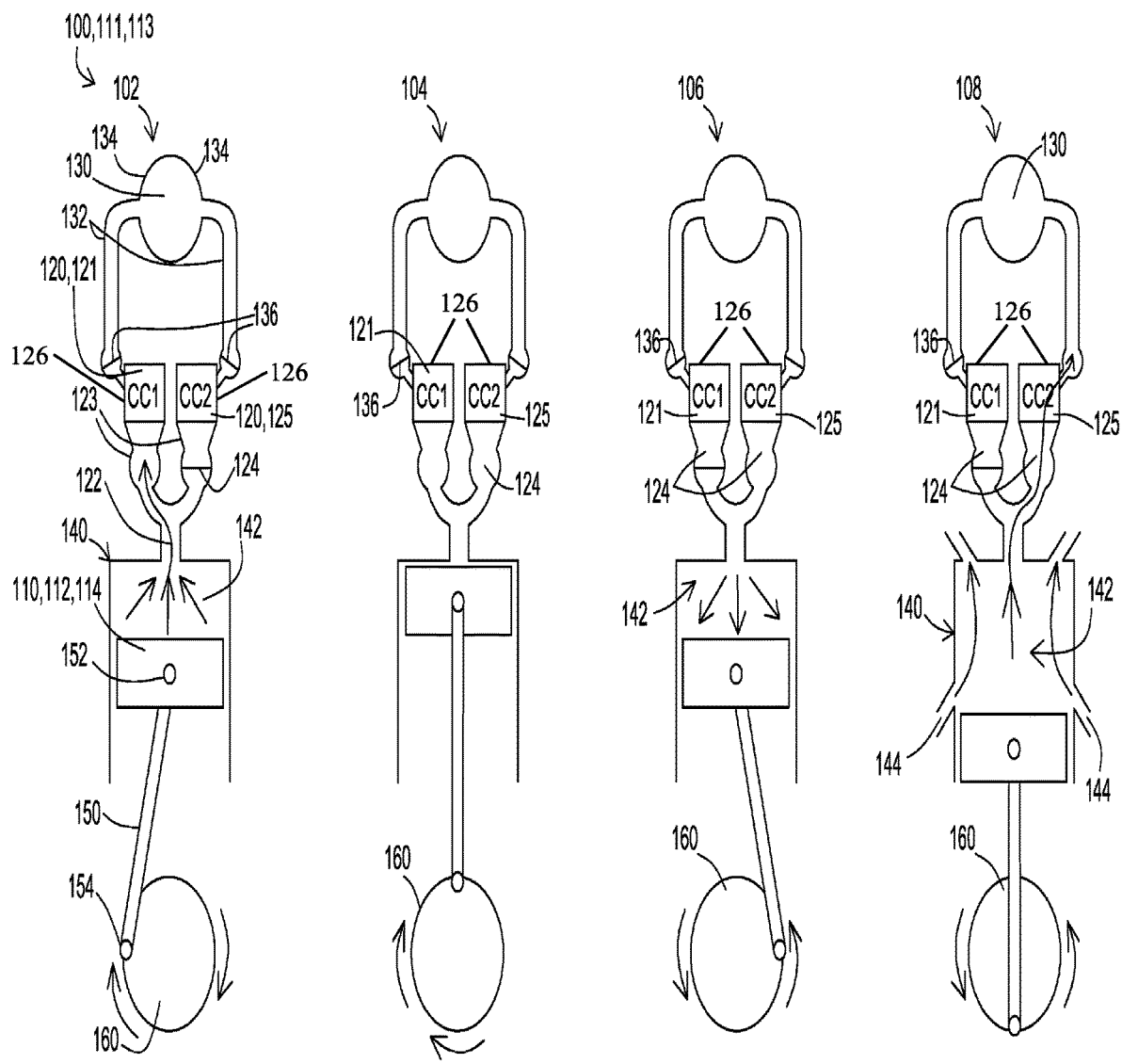
FIG. 1A illustrates a front view of a plurality of systems to utilize a plurality of slow burning fuels that contain ash, in accordance with one embodiment of the present invention.

FIG. 1A illustrate a front view of a plurality of systems 100 to utilize a plurality of slow burning fuels that contain ash, in accordance with one embodiment of the present invention. The system 100 includes a piston 110, a pair of combustion chambers 120, an ash bin 130, a cylinder 140, a connecting rod 150 and a crankshaft 160. The piston 110 is utilized as a compressor 112 and an expander 114 and can be any suitable type of piston 111 or wankel design 113. The pair of combustion chambers 120 are each individually integral through a y-shaped pathway 122 to each piston 110. Each y-shaped pathway 122 has a pair of individual pathways 123 that is each provided with a cylinder valve 124. The ash bin 130 is above the pair of combustion chambers 120 with a pathway 132 on each side 134 of the ash bin 130 that is integral to each individual combustion chamber 120. An ash valve 136 is provided that is integral to each individual combustion chamber 120 to control any ash moving between the ash bin 130 and the pair of combustion chambers 120. The ash valve 136 must be located on each combustion chamber 120 near its outside circumference 126 where the ash is spun against the outside wall of the ash bin 130 and ash bin pathways 132. The cylinder 140 is integral to the y-shaped pathway 122 and produces any gases 142 that are produced by the piston 110 emitted from the cylinder 140. The piston 110 is housed within the cylinder 140 and as previously indicated is utilized as a compressor and an expander. The connecting rod 150 has a distal end 152 and a proximal end 154 and the distal end 152 is attached to the piston 110 to move the piston 110 up and down within the cylinder 140. The crankshaft 160 is attached to the proximal end 154 and rotates the connecting rod 150 to assist the movement of the piston 110 within the cylinder 140. In other words, the crankshaft 160 is a rotational element.

FIG. 1A illustrates a first system 102 where the crankshaft 160 is 90 degrees before top dead center. The first system 102 illustrates a compression of gases 142 into a first combustion chamber 121. The cylinder valve 124 between the cylinder 140 and the first combustion chamber 121 must be open to allow the cylinder 140 to compress gases 142 into the first combustion chamber 121 while the ash valve 136 of the first combustion chamber 121 is closed. Meanwhile in a second combustion chamber 125, the cylinder valve 124 and ash valve 136 of the second combustion chamber 125 are closed and ash is being separated from the gases 142 with a rotational spinning motion.

FIG. 1A illustrates a second system 104 where the crankshaft 160 is at top dead center. On the first combustion chamber 121, the ash valve 136 is closed but the cylinder valve 124 is about to close at or just after top dead center. Meanwhile in the second combustion chamber 125 the ash valve 136 is closed and the cylinder valve 124 of the second combustion chamber 125 is about to open at or just after top dead center.

FIG. 1A illustrates a third system 106 where the crankshaft 160 is 90 degrees after top dead center. In the first combustion chamber 121, combustion has completed and ash is being spun out while the cylinder valve 124 of the first combustion chamber 121 and the ash valve 136 of the first combustion chamber 121 are closed. In the first combustion chamber 121 centrifugal and electrostatic ash separation are proceeding while the ash valve 136 and the cylinder valve 124 are closed. In the second combustion chamber 125, the ash has already been spun to the wall of the second combustion chamber 125 and the ash valve 136 is closed while the cylinder valve 124 is open allowing the gases 142 which are heated to expand through the cylinder valve 124 and provide energy on expansion on the surface of piston 120.

FIG. 1A illustrates a fourth system 108 where the crankshaft 160 is at bottom dead center and the gases 142 are exhausted with fresh intake air 144. The fresh intake air 144 is oxygenated air and assists in removal of the gases 142. If the fourth system 108 was using a fuel that contained ash, the ash which is denser than air will be spun into the first combustion chamber 121 wall by centrifugal forces. To prevent ash filling up the first combustion chamber 121 the ash must be expelled from the first combustion chamber 121. The ash can then be disposed of through a separate pathway that leads to an ash container or other suitable container (not shown). The pathway must have a valve which can be a rotary valve, poppet valve or other suitable type of valve (not shown). If the ash valve 136 is open, air will drag the ash through the ash valve 136 toward the ash bin or container. It is suitable to open the ash valve 136 at or near bottom dead center. It is not necessary for the ash valve 136 to be always in an open position, but it must open often enough to allow adequate removal of ash from the first combustion chamber 121. The ash valve 136 allows exit of ash from the first combustion chamber 121 without ash passing through the cylinder 124.

The ash valves 136 allow any ash to exit through the ash valves 136 instead of the cylinder valve 124. The ash that exits through the ash valve 136 does not pass into the cylinder valve 124. The ash valves 136 are usually closed but open when the cylinder valve 124 is open and the cylinder 140 is near bottom dead center. The fresh intake air 144 that enters the cylinder 140 passes through the cylinder valve 124 and into the combustion chamber 120 and drags ash on the side wall of the combustion chamber 120 out of the ash valve 136. The intake air 144 with ash flushes out the ash out of the combustion chamber 120 into the ash bin. This prevents the ash from returning into the cylinder 140 and taking a separate pathway to the ash bin 130 that does not pass through the cylinder 140 and cannot scratch or damage the cylinder 140.

Figure 1B:
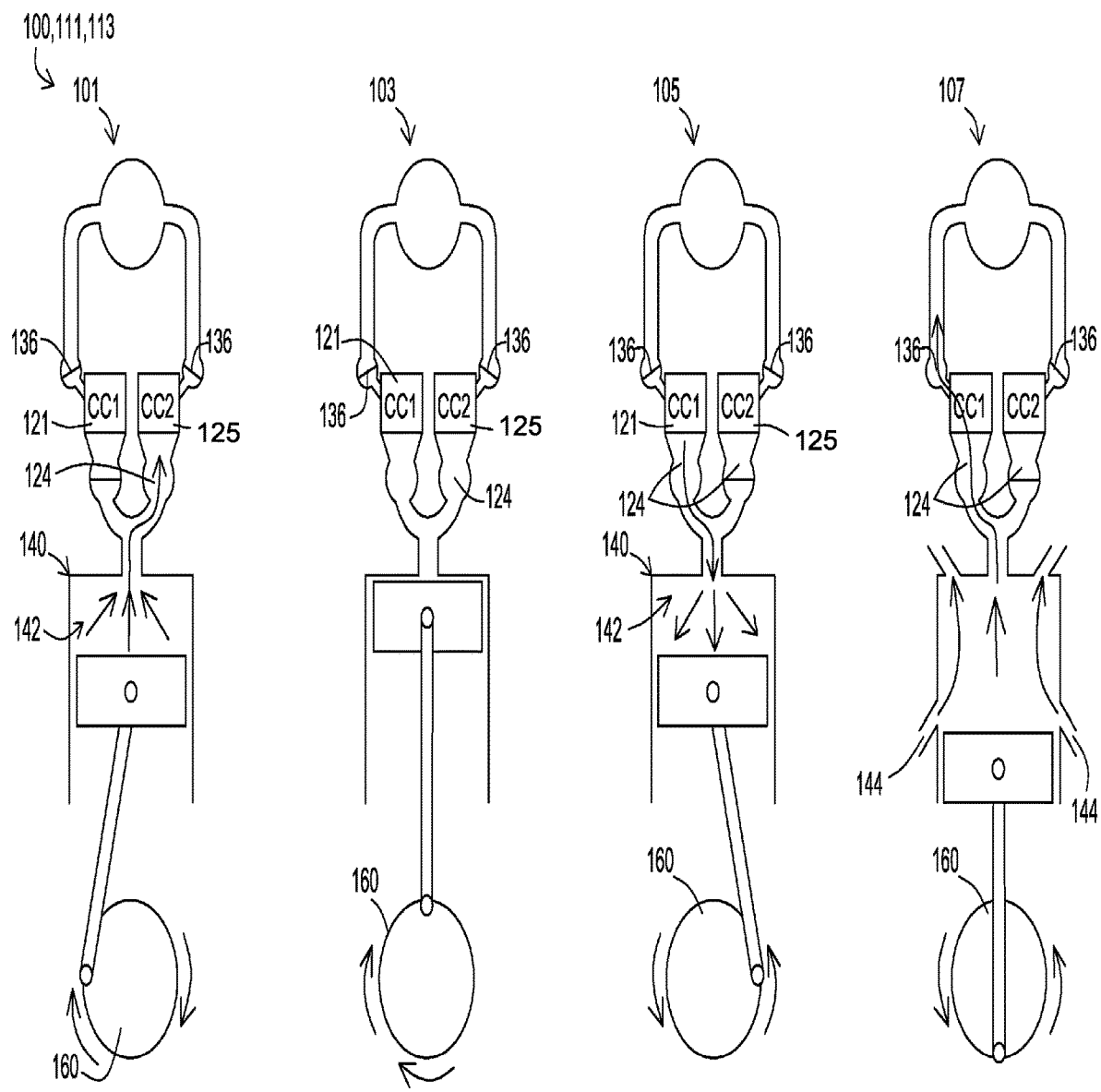
FIG. 1B illustrates a front view of a plurality of systems to utilize a plurality of slow burning fuels that contain ash, in accordance with one embodiment of the present invention.

FIG. 1B illustrates a front view of a plurality of systems 100 to utilize a plurality of slow burning fuels that contain ash, in accordance with one embodiment of the present invention.

FIG. 1B illustrates a fifth system 101 where the crankshaft 160 is approximately ninety degrees before top dead center. In the first combustion chamber 121 the combustion process is completed and the ash is being separated while the cylinder valve 124 and ash valve 136 of the first combustion chamber 121 are closed. The fifth system 101 shows compression of gas into the second combustion chamber 125. The cylinder valve 124 of the second combustion chamber 125 is open but the ash valve 136 of the second combustion chamber 125 is closed so that the cylinder 140 can compress the gases 142 into the second combustion chamber 125.

FIG. 1B illustrates a sixth system 103 where the crankshaft 160 is at top dead center. On the first combustion chamber 121, the ash valve 136 is closed but the cylinder valve 124 of the first combustion chamber 121 is about to open at or just after top dead center. On the second combustion chamber 125, the ash valve 136 is closed and the cylinder valve 124 on the second combustion chamber 125 is about to close at or just after top dead center.

FIG. 1B illustrates a seventh system 105 where the crankshaft 160 is 90 degrees after top dead center. Gases 142 are expanding out of the first combustion chamber 121 through the cylinder valve 124 into the cylinder 140 while the ash valve 136 on the first combustion chamber 121 is closed. In the second combustion chamber 125 the ash valve 136 and the cylinder valve 124 of the second combustion chamber 125 are closed while combustion and centrifugal and electrostatic ash separation are proceeding while the ash valve 136 and cylinder valve 124 are closed.

FIG. 1B illustrates an eighth system 107 where the crankshaft 160 is at bottom dead center. In the first combustion chamber 121, the ash valve 136 is open and fresh intake air 144 is flooding through the open cylinder valve 124 into the first combustion chamber 121 and blowing ash through the open ash valve 136 of the first combustion chamber 121 to the ash bin. In the second combustion chamber 125, the ash valve 136 and the cylinder valve 124 of second combustion chamber 125 are closed while combustion and centrifugal and electrostatic ash separation are proceeding while the ash valve 136 and cylinder valve 124 are closed.

Figure 2:
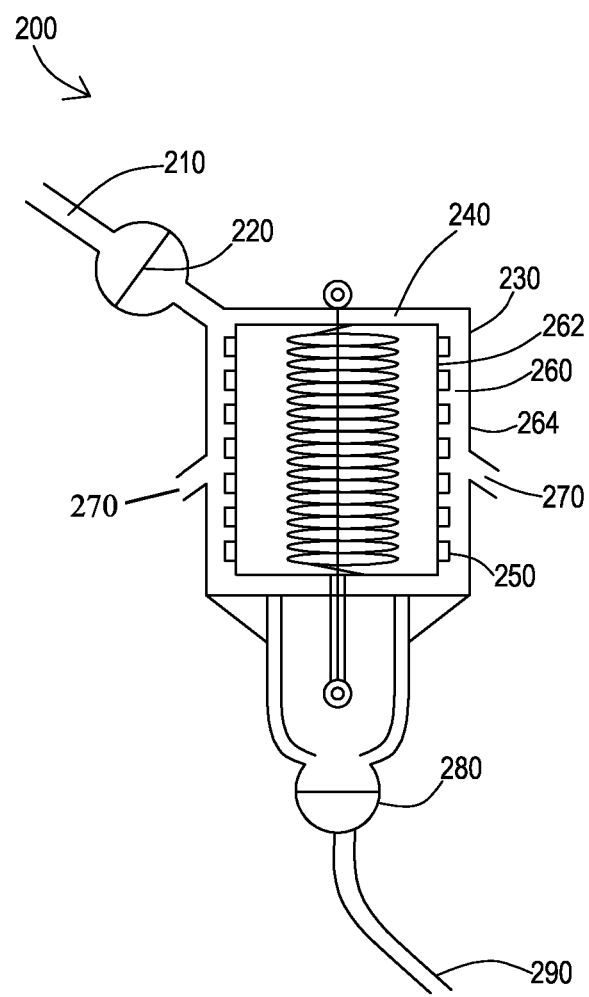
FIG. 2 illustrates a front view of a combustion chamber with a removed front portion, in accordance with one embodiment of the present invention.

FIG. 2 illustrates a front view of a combustion chamber 200 with a removed front portion, in accordance with one embodiment of the present invention. The combustion chamber 200 includes a pathway 210, an ashbin valve 220, an outer wall 230, a spinning rotor 240, a fan blade 250, a combustion and separation space 260, one or more injection ports 270, a cylinder valve 280 and a cylinder pathway 290. The pathway 210 is a pathway that leads to an ash bin. The ashbin valve 220 opens and closes the pathway 210 that leads to the ash bin. The outer wall 230 is the outer wall of the combustion chamber 200. The spinning rotor 240 is housed and spins within the combustion chamber 200. The fan blade 250 can be one or more fan blades 250 that are attached to the spinning rotor 240 and spins air in the combustion chamber 200. The combustion and separation space 260 is the space between the wall 262 of the spinning rotor 240 and the wall 264 of combustion chamber 200 where combustion occurs and ash is separated. The one or more injection ports 270 are where fuel or fuel and water mix are injected with potentially one or more injection ports 270 located on each combustion chamber 200. The cylinder valve 280 is a valve that can be any suitable valve. The cylinder pathway 290 leads to the cylinder (not shown) that includes the cylinder valve 280 that opens and closes the cylinder pathway 290.

Figure 3:
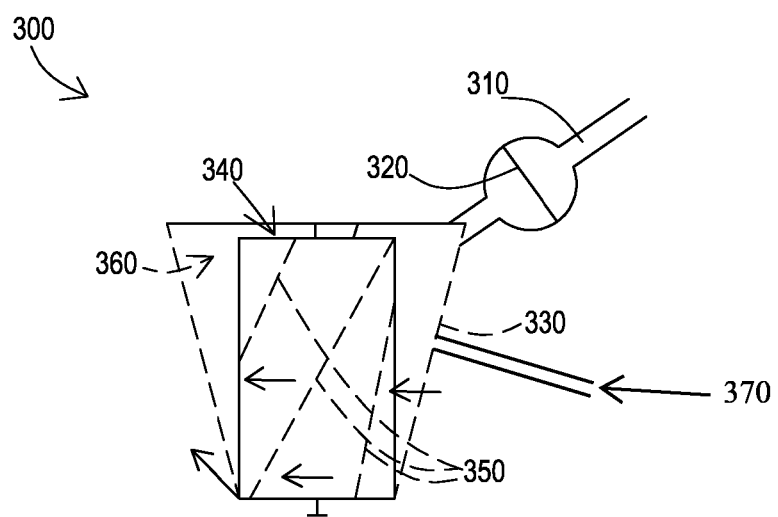
FIG. 3 illustrates a front view of a combustion chamber, in accordance with one embodiment of the present invention.

FIG. 3 illustrates a front view of a combustion chamber 300, in accordance with one embodiment of the present invention. The combustion chamber 300 includes a pathway 310, a valve 320, an outer wall 330, a rotor 340, one or more fan blades 350, a combustion and separation space 360 and an injection port 370 similar to the injection port 270. The combustion chamber 300 is also cone-shaped 302. The pathway 310 leads to an ash bin (not shown). The valve 320 is set inside the pathway 310 and opens and closes the pathway 310 that leads to the ash bin. The outer wall 330 is the outer wall of the combustion chamber 300. The rotor 340 rotates and is housed within the combustion chamber 300. The one or more fan blades 350 attaches to the rotor 340 and internally spins air in the combustion chamber 300. The combustion and separation space 360 is space between the wall of the rotor 340 and the wall of the combustion chamber 300 where combustion occurs and ash is separated.

Figure 4:
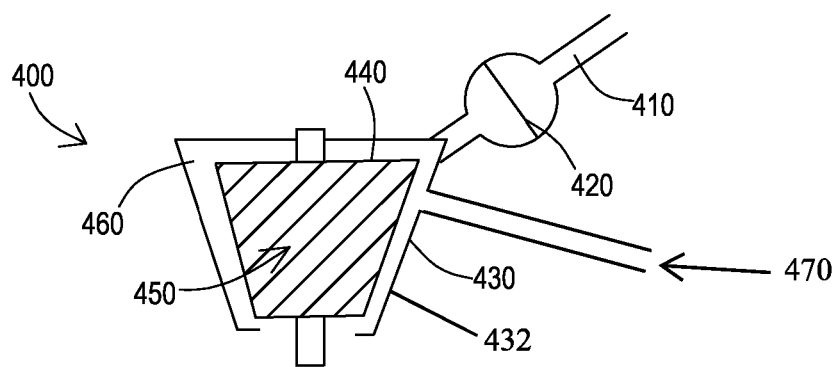
FIG. 4 illustrates a front view of a combustion chamber, in accordance with one embodiment of the present invention.

FIG. 4 illustrates a front view of a combustion chamber 400, in accordance with one embodiment of the present invention. The combustion chamber 400 includes a pathway 410, a valve 420, an outer wall 430, a rotor 440, one or more fan blades 450, a combustion and separation space 460 and an injection port 470 similar to the injection port 270. The pathway 410 leads to an ash bin (not shown). The valve 420 is set inside the pathway 410 to the ash bin and opens and closes and leads to the ash bin. The outer wall 430 is the outer wall of the combustion chamber 400 and has a general cone-shape 432 but can be any suitable shape. The outer wall 430 can also be grounded. The rotor 440 rotates within the combustion chamber 400 and can have a positive charge. The one or more fan blades 450 attach to the rotor 440 and rotate air within the combustion chamber 400 and can be made of a nonconductive material or other suitable material. The combustion and separation space 460 is between the fan blades 450 and the outer wall 430 of the combustion chamber 400 where combustion occurs and ash is separated. The ash valve can also be grounded and as the ash is spun against the outer wall 430 as it moves toward the valve 420.

Figure 5:
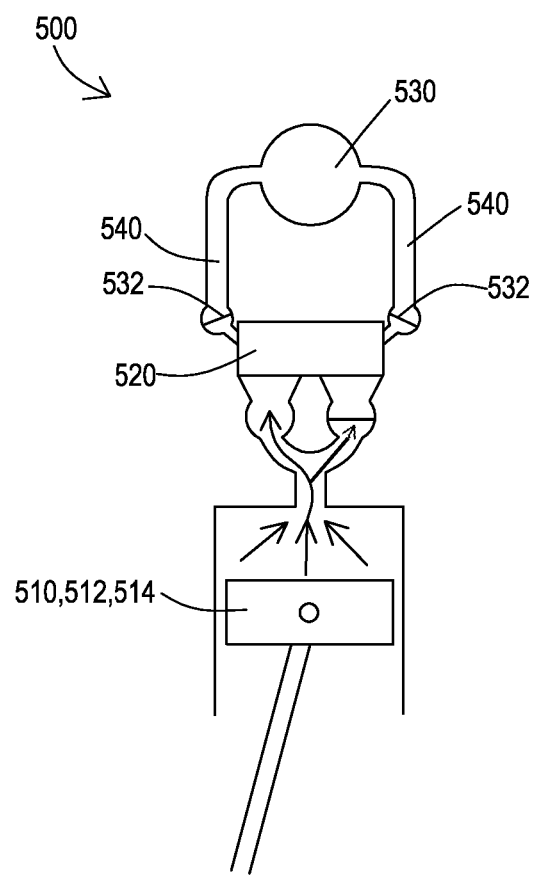
FIG. 5 illustrates a front view of a system to utilize a plurality of slow burning fuels that contain ash, in accordance with one embodiment of the present invention.

FIG. 5 illustrates a front view of a system 500 to utilize a plurality of slow burning fuels that contain ash, in accordance with one embodiment of the present invention. The system 500 utilizes a plurality of slow burning fuels that contain approximately 5 percent or more water and less than approximately 0.1 percent ash, although other suitable slow burning systems can be utilized with the system 500.

The system 500 includes a compressor and an expander 510, a single combustion chamber 520, an ash bin 530 and a pathway 540. The expander 510 is of a piston 512 or a wankel design 514 or any other suitable design. The single combustion chamber 520 is connected to the compressor and expander 510. The ash bin 530 is connected to the combustion chamber 520 through a valve 532. The pathway 540 is from the combustion chamber 520 to the ash bin 530 and is designed to prevent ash backwash.

Figure 6:
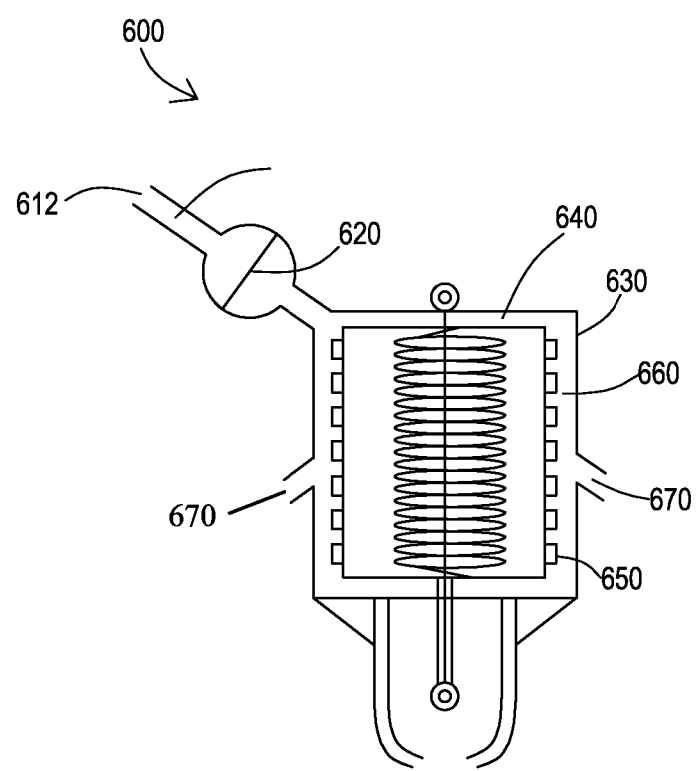
FIG. 6 illustrates a front view of a cone-shaped combustion chamber, in accordance with one embodiment of the present invention.

FIG. 6 illustrates a front view of a cone-shaped combustion chamber 600, in accordance with one embodiment of the present invention.

The cone-shaped combustion chamber 600 includes a pathway 610, an ashbin valve 620, an outer wall 630, a spinning rotor 640, one or more fan blades 650, a combustion and separation space 660 and one or more injection ports 670. The pathway 610 leads to an ashbin 612. The ashbin valve 620 opens and closes the pathway 610 that leads to the ash bin 612. The outer wall 630 is the outer wall of the combustion chamber 600. The spinning rotor 640 is housed and spins within the combustion chamber 600. The one or more fan blades 650 are made of nonconductive material that are attached to the spinning rotor 640 and spins air in the combustion chamber 600. The combustion and separation space 660 is between the spinning rotor 640 and the outer wall 630 of the combustion chamber 600. The one or more injection ports 670 are located on the combustion chamber 600.

The ash can exit through an ash valve to an exterior dust bin or other suitable bin. The heated gas can return to the cylinder or the expander with any ash removed. Adding an electrostatic system to the centripetal ash separation makes the overall system relatively more effective. The system requires relatively rapid separation of dust from combustion gas within milliseconds. There can be from approximately 500 milliseconds to as little as approximately ten milliseconds for combustion and ash separation to occur. The system is to maximize the speed of separation of ash from combustion gas in the combustion chamber. The electrostatic separation process can be separated into several phases. The first phase is placing a charge on a plurality of dust particles. In a coal fired steam plant using electrostatic precipitator particles, charging occurs over hundreds of milliseconds. The system is designed so the fuel contains ash before it is injected into the combustion chamber. As the ash containing fuel and water pass through the injector and nozzle the ash acquires charge.

In many fuel systems an engineer would be afraid of explosions by charging fuel. However when carbon fuels are mixed with water, this would reduce the explosive nature of the fuel. The charged fuel water mixture that contains the dust particles can be injected into the combustion chamber. The electrical system can be placed near the ash valve. The system can also place a charge on one or more lubricated surfaces of the expander to repel the coal ash. This may be a potential method of reducing the ash deposition on the one or more lubricated surfaces.

It is anticipated that emulsion based fuels will be developed that contain less than 0.1% ash but still contain more than 5% water by weight. These fuels will not need the elaborate two combustion chambers per compressor but use only one combustion chamber with a rotating body. A single chamber can still provide a rotating body to store and release heat of fuels that contain water. A separate pathway from the combustion chamber to said ash bin designed to prevent ash backwash.

The system that utilizes a plurality of slow burning fuels that contain 5% or more water and less than 0.1% ash that includes a compressor and an expander of a piston or a wankel design, a combustion chamber connected to the compressor and the expander, an ash bin that is connected to the combustion chamber through a valve and a pathway from said combustion chamber to said ash bin designed to prevent ash backwash. The system can also include a combustion chamber that includes a pathway that leads to an ashbin, an ashbin valve that opens and closes the pathway that leads to the ash bin, an outer wall of the combustion chamber, a spinning rotor that is housed and spins within the combustion chamber, one or more fan blades that are attached to the spinning rotor and spins air in the combustion chamber, a combustion and separation space that is between the spinning rotor and the outer wall of the combustion chamber and one or more injection ports located on the combustion chamber. The combustion and separation space is where combustion occurs and ash is separated. The combustion chamber also includes one or more injection ports that inject a fuel emulsion containing a fuel and water mix.

The system can also include a cone-shaped combustion chamber that includes a pathway that leads to an ash bin, a valve that is set inside the pathway and opens and closes the pathway that leads to the ash bin, an outer wall of the combustion chamber; a rotor that rotates and is housed within said combustion chamber, one or more fan blades that attaches to the rotor and internally spins air in the combustion chamber and a combustion and separation space between a wall of the rotor and the outer wall of the combustion chamber. The combustion and separation space is where combustion occurs and ash is separated. The one or more fan blades are made of a nonconductive material and where the rotor rotates within the combustion chamber and has a positive charge.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A cone-shaped combustion chamber comprising:
   a pathway that leads to an ash bin;
   a valve that is set inside the pathway;
   the valve opening and closing the pathway that leads to the ash bin;
   an outer wall;
   a spinnable rotor that is housed within the outer wall;
   one or more fan blades attached to the spinnable rotor;
   a combustion and separation space disposed between a wall of the spinnable rotor and the outer wall; and
   wherein when the spinnable rotor spins, the one or more fan blades spin.

2. The cone-shaped combustion chamber according to claim 1,
   wherein the one or more fan blades are made of a nonconductive material.

3. A cone shaped combustion chamber comprising:
a pathway that leads to an ash bin;
an ash bin valve that opens and closes the pathway;
an outer wall;
a spinnable rotor that is housed within the outer wall;
one or more fan blades made of nonconductive material that are attached to the spinnable rotor;
a combustion and separation space disposed between the spinnable rotor and the outer wall;
an injection port located on each the combustion chamber;
the injection port being configured to receive a fuel and water mix; and
wherein when the spinnable rotor spins, the one or more fan blades spin.

4. A combustion chamber comprising:
a pathway that leads to an ash bin;
an ash bin valve that opens and closes the pathway that leads to the ash bin;
an outer wall;
a spinnable rotor housed within the outer wall;
one or more fan blades attached to the spinnable rotor;
a combustion and separation space between the spinnable rotor and the outer wall;
an injection port located on the outer wall;
the injection port being configured to receive a fuel;
a cylinder pathway that leads to the cylinder;
a cylinder valve that opens and closes the cylinder pathway that leads to the cylinder; and
wherein when the spinnable rotor spins, the one or more fan blades spin.

5. A system to convert a slow burning fuel that contains ash into energy comprising:
a piston;
a pair of combustion chambers;
a Y-shaped pathway;
the pair of combustion chambers being in communication with the piston through the Y-shaped pathway;
the Y-shaped pathway having a pair of individual pathways each provided with a cylinder valve;
an ash bin;
the ash bin being disposed above the pair of combustion chambers, wherein there is a pathway extending from each side of the ash bin that is in communication with each of the pair of combustion chambers;
an ash valve provided in each of the pair of combustion chambers;
a cylinder;
the cylinder being in communication with the Y-shaped pathway;
the piston being housed within the cylinder;
a connecting rod with a distal end and a proximal end;
the distal end being attached to the piston;
a rotational element;
the rotational element being attached to the proximal end; and
wherein when the rotational element rotates, the piston moves up and down within the cylinder via the connecting rod.

6. The system according to claim 5, wherein the ash valve is located on each combustion chamber near an outside circumference.

7. The system according to claim 5, wherein when the rotational element rotates to drive the proximal end to a first position, the proximal end is 90 degrees before a top dead center.

8. The system according to claim 5, wherein when the rotational element rotates to drive the proximal end to a second position, the proximal end is at a top dead center.

9. The system according to claim 5, wherein when the rotational element rotates to drive the proximal end to a third position, the proximal end is 90 degrees after a top dead center.

10. The system according to claim 5, wherein when the rotational element rotates to drive the proximal end to a fourth position, the proximal end is at a bottom dead center.

* * * * *